Nov. 1, 1955

A. C. ROUTH 2,722,177

APPARATUS FOR MAKING VARIEGATED
ICE CREAMS AND LIKE SUBSTANCES
Filed Feb. 15, 1951

INVENTOR.
ALMOND C. ROUTH
BY
ATTORNEY

United States Patent Office 2,722,177
Patented Nov. 1, 1955

2,722,177

APPARATUS FOR MAKING VARIEGATED ICE CREAMS AND LIKE SUBSTANCES

Almond C. Routh, Sandusky, Ohio

Application February 15, 1951, Serial No. 211,150

5 Claims. (Cl. 107—1)

The present invention relates generally to apparatus for making a frozen edible product, and it has particular relation to the manufacture of a variegated ice cream or like substances, which have variegations of a flavoring material of a contrasting color dispersed therein and therethrough.

Heretofore, a base of semi-frozen ice cream maintained in a plastic state has been fed under pressure to a chamber, whereupon successive charges of a contrasting chocolate flavoring syrup have been injected therein in spaced relation, the amount of syrup injected in the ice cream base being controlled by the speed of the mechanical actuation of the syrup control device. Such devices include a rotary disk valve having an apertured port adapted to successively align itself during rotation with a series of spaced apertured outlets leading into the discharging basic substance. This type of device operates satisfactorily in conjunction with a chocolate syrup flavoring material, but becomes clogged and jammed when a fibrous or pulpy type flavoring such as that made from fresh berries, as for example strawberries, raspberries, etc., is being injected. This type of flavoring requires constant breaking and cutting of the fibrous material to eliminate clogging and jamming between the moving parts thereof.

An object of the present invention is to provide a new and improved means capable of breaking and cutting the fibrous pulpy content of the berry flavorings as they pass through the control valve and are being injected into the moving stream of plastic ice cream and the like base substance.

Another object of the invention is the provision of a new, simple and inexpensive rotary cutting device for constantly and continuously cutting and breaking the fibrous pulpy structure of berry flavorings in order to prevent jamming and to insure a continuous and uninterrupted flow of a series of short injections of the flavoring material into a constantly moving stream of basic substance.

A further object of the invention is to provide an improved apparatus for controlling the flow of contrasting flavoring material in the base substance while achieving the aforesaid results in an efficient, economical, sanitary and highly expeditious manner.

Other and further objects and advantages of the invention reside in the detailed description of the apparatus, which result in simplicity, economy and efficiency, and which will be apparent from the following description, reference being had to the accompanying drawings, forming a part hereof, wherein like numerals indicate like parts, in which.

Figure 1:
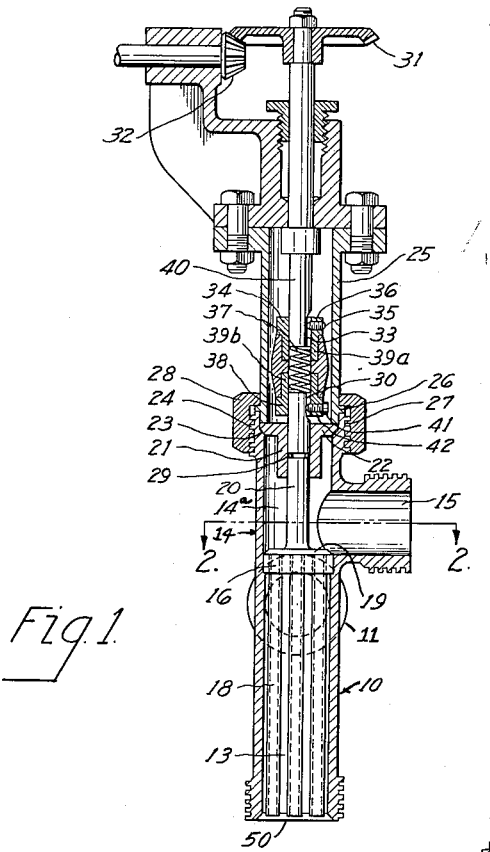
Figure 1 is an assembled longitudinal sectional view, with parts in elevation, of an apparatus made in accordance with the principles of my invention.
Figure 4:
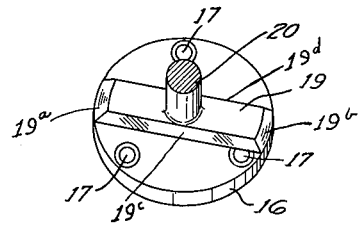
Figure 2:
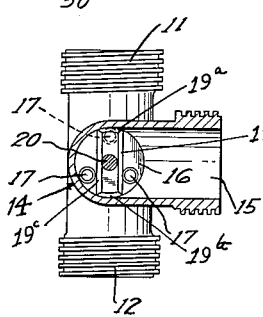
Figure 2 is a cross-sectional view of the apparatus shown in Figure 1, the same being taken substantially along the line 2—2 thereof, looking in the direction of the arrows.
Figure 3:
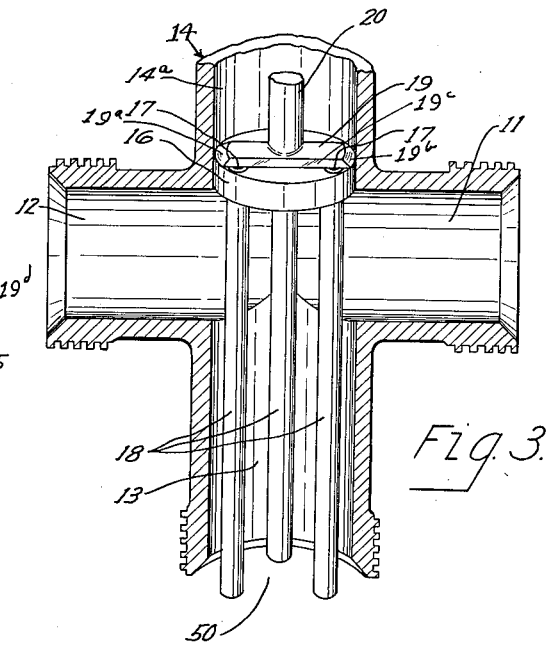

Figure 3 is an enlarged sectional view of the rotary valve chamber shown in Figure 2, wherein the cylindrical baffle plate having a series of apertured ports provided with depending delivery tubes and the rotary cutting blade are shown in elevation; and Figure 4 is another perspective view, on a slightly larger scale, of the apertured cylindrical baffle plate and its cooperating flat rotary cutting blade member, which serve to cut off the fibrous flavoring material passing therethrough to provide intermittent shots or injections of said flavoring material into said basic substance.

Referring now to the drawings, there is shown apparatus for making a variegated product, which consists of a lower extrusion tube 10 and an upper extrusion tube 14 connected longitudinally. The basic substance, such as soft ice cream and the like material, may be delivered from an outside source of supply, which is not shown, but may be a hopper or container of the type illustrated and described in my Letters Patent No. 2,389,084, issued November 13, 1945. The lower extrusion tube 10 is substantially circular in cross-section, and is provided with a plurality of inlets 11 and 12, which extend at right angles to its vertically disposed lower outlet 13.

The upper extrusion tube 25 is mounted removably in axial alignment above the lower extrusion tube 10, and is in open communication therewith through a series of apertures 17 extending through a baffle plate 16 mounted immediately above the laterally extending inlets 11 and 12 of said lower extrusion tube 10. A delivery tube 18 is adapted to be mounted within each of said apertures 17, and depends from the under side of the baffle plate 16 downwardly within the lower outlet chamber 13 of said lower extrusion tube 10. The delivery tubes 18 are adapted to convey the contrasting flavoring material received through their respective apertures 17 and discharge it into the continuously moving stream of basic substance, such as soft ice cream and the like, passing through the delivery outlet portion 13 of the lower extrusion tube 10.

A substantially flat cutting blade member 19 having a relatively narrow width as compared to its length, which is approximately the diameter of the baffle plate 16, is axially mounted rotatably and contiguously thereabove. The blade member 19 is fixedly mounted on the lower end of a shaft 20, as by welding or the like, and is provided with an arcuate pair of downwardly and outwardly beveled end portions 19a and 19b, and a pair of parallel downwardly and outwardly beveled side portions 19c and 19d. The end portions 19a and 19b and the beveled side portions 19c and 19d provide beveled cutting edges, as best shown in Figures 2 and 3, which continuously and effectively cut any fibrous structure in the fruit flavorings as it swings periodically over the spaced apertures. The beveled cutting blade 19 is shown as being generally rectangular in form and relatively narrow. Its length is slightly less than the diameter of said baffle plate 16, and its ends 19a and 19b extend beyond any of the apertures 17 therein. The minimum width of the cutting blade 19 is at least equal to the width of one of said apertures, so that when passing periodically thereover it will be capable of entirely closing said aperture to cause said flavoring to be injected in the basic substance in separate and distinct portions.

The cutting blade 19 is mounted substantially flush or in surface to surface contact with the upper surface of the baffle plate 16 so that when the blade 19 is rotated over its upper surface it periodically opens and closes said apertures. Obviously, the under surfaces of the blade 19 will give a "wiping" action to said surface, and the beveled edges 19a, 19b, 19c and 19d will assist in cutting any fibrous particles tending to adhere to the upper surface of said baffle plate 16 or become wedged between said blade 19 and the baffle plate 16, thereby cutting them into said apertures 17 as the blade 19 moves thereover.

It will be obvious that the baffle plate 16 may be provided with any number or sizes of apertures. The number of apertures will serve to control to some extent the ratio of flavoring material to be introduced into the basic substance, and the size of the apertures will serve to control the fineness or coarseness of the individual particles or injections of flavoring material in said basic substance. The ratio of flavoring to the basic substance may also be controlled by the speed of rotation of the cutting blade 19.

The rotary cutting blade 19 is secured fixedly to the lower end of a cylindrical shaft 20, as aforesaid, and said shaft extends vertically upwardly through the upper extrusion tube 14. The shaft 20 passes through a bored closure cap 21, having a head portion 22, which rests upon tapered shoulders 23 provided by the inner wall surfaces of the lower extrusion tube 10 adjacent its uppermost outwardly screw-threaded end portions 24 thereof. A generally tubular cylinder 25 is provided with an outwardly projecting cylindrical shoulder 26 adjacent its lowermost end, seated as at 27 upon the head portion 22, and an internally screw-threaded sleeve 28 is adapted to connect together the cylinder 25 and the lower extrusion tube 10. The shaft 20 is provided with a gasket 29 intermediate its ends, and is provided with a flattened lateral surface 30 adjacent its uppermost end, which projects upwardly within the cylinder 25. The shaft 20 is rotated by a second shaft 40 which, in turn, is rotated by means of a gear 31 and a pinion 32 driven from a suitable source of power such as, for example, a variable speed motor (not shown).

The shaft 40 is adapted to be brought into driving engagement with the rotary valve shaft 20 in the following manner: The shaft 40 is mounted in a vertical depending position within the cylinder 25, and is provided with a flattened lateral surface 33 at its lower end. A sleeve 34 is fitted over the end of the shaft 40, and is secured thereto by means of a set screw 35, which projects through an aperture 36 and may be threaded into frictional engagement with the flattened surface 33 of the shaft 40. A coil spring 37 is disposed between the shaft 40 and the rotary valve shaft 20, and a second sleeve 38 is fitted over the upper end of the shaft 20. A sleeve enclosing band, which is H-shape in cross-section, is slidingly fitted over the reduced portions 39a and 39b of the sleeves 34 and 38, respectively. A stud bolt 41 projects through an aperture 42 in the enlarged end of the sleeve 38, and is adapted to be threaded into almost actual contact with the flattened surface 30 of the rotary valve shaft 20. Thus, it will be apparent that slight vertical movement between the connected rotating shafts 20 and 40 will be permitted, and that pressure of the spring 37 on the top of the rotary valve shaft 20 will cause the cutting blade 19 to "wipe" and "scrape" the upper surface of the baffle plate 16 as it is being rotated.

In the operation of the apparatus, it will be assumed that the basic substance, such as soft plastic ice cream, is being forced under pressure into the inlet ports 11 and 12, filling the lower portion 13 of the lower extrusion tube 10; that a pulpy plastic flavoring material is likewise being forced under a corresponding pressure into the inlet port 15 of the upper extrusion tube 14, filling its chamber 14a and passing through the apertures 17 in the baffle plate 16 and into the depending delivery tubes 18 projecting downwardly into the lower chamber 13 of the relatively large extrusion tube 10; and that the shaft is rotating and causing the cutting blade 19 to be moved rapidly in surface to surface contact over the upper surface of the baffle plate 16.

It will be readily apparent, under such assumed conditions, that the blade 19 will successively pass over one or more apertures 17, stopping the continuous flow of flavoring material through such holes as it covers and closes momentarily. As it passes over said apertures 17, its lateral beveled cutting edges 19c and 19d will cut any fibrous material passing thereinto or caught between the moving surfaces. The end beveled cutting edges 19a and 19b will be at all times tending to cut any fibrous structure adjacent the outer edges of the baffle plate 16.

If the rotating blade 19 did not cover an entire aperture, a continuous flow of flavoring material would be forced through said aperture and out of the lower ends of the tubes 18, and the final composite product would resemble a relatively large tube of basic ice cream having a plurality of spaced relatively small tubes of contrasting flavoring material therein. However, when the blade 19 covers an aperture, it cuts off the flow of flavoring material momentarily through its respective delivery tube 18 and no syrup is ejected at that time from that particular tube into the relatively large mass of ice cream, this being so because there is no pressure on the flavoring material in said tube to force its outermost contents to be ejected. By closing and opening said apertures in rapid succession, the flavoring material is ejected into the moving stream of basic material in a series of spaced "shots" or "charges," forming a definite and desirable intermittent pattern therethrough. The pattern of flavoring material in the basic substance can be controlled and varied by changing the speed of the rotary cutting blade, by means of its variable speed driving motor, or by using a baffle plate provided with a smaller or larger number of apertures, or using apertures of different sizes and shapes. It is not difficult to remove the baffle plate 16 and substitute one of a different construction, when desired.

Although I have only described in detail one form which the invention may assume, it will be readily apparent to those skilled in the art that the same is not so limited, but that various modifications may be made therein without departing from the spirit thereof or from the scope of the appended claims.

What I claim is:

1. Apparatus for making a variegated product comprising an upper extrusion tube and a lower extrusion tube connected longitudinally, an apertured baffle plate mounted within the upper extrusion tube, said aperture of said baffle plate having a delivery tube depending therefrom and extending into said lower extrusion tube, said lower extrusion tube having an inlet and an outlet through which a base material may be forced under pressure, the upper extrusion tube having an inlet above said baffle plate for receiving under pressure a contrasting flavoring material, a shaft entering through said upper tube, a cutting blade mounted on the lower end of said shaft, said cutting blade having surface to surface contact with the upper surface of said baffle plate as it swings thereover, said blade having a length less than the diameter of said baffle plate and a width greater than the width of said aperture whereby it will cut off the flow of flavoring material whenever it passes over said aperture, and means for rotating said blade.

2. Apparatus for making a variegated product comprising an upper extrusion tube and a lower extrusion tube connected longitudinally, a baffle plate having a series of spaced apertures mounted within the upper extrusion tube, each aperture having a delivery tube depending therefrom and extending downwardly into said lower extrusion tube, said lower extrusion tube having an inlet and outlet through which a base material may be forced under pressure, the upper extrusion tube having an inlet above said baffle plate for receiving under pressure a contrasting flavoring material, a shaft entering through said upper tube, a rotary cutting blade mounted on the lower end of said shaft, said blade having surface to surface contact with the upper surface of said baffle plate as it swings thereover, said blade member having a length slightly less than the diameter of the baffle plate and a width slightly wider than the diameter of the widest of said apertures, said blade being provided with a plurality of beveled cutting edges for cutting off the flow of flavoring material as it moves periodically over the apertures in said baffle plate, and means for rotating said blade.

3. Apparatus for making a variegated product comprising an upper extrusion tube and a lower extrusion tube connected longitudinally, a baffle plate having a series of spaced apertures mounted within the upper extrusion tube, each aperture having a delivery tube depending therefrom and extending downwardly into said lower extrusion tube, said lower extrusion tube having an inlet and outlet through which a base material may be forced under pressure, the upper extrusion tube having an inlet above said baffle plate for receiving under pressure a contrasting flavoring material, a shaft extending axially through said upper tube, a rotary cutting blade mounted on the lower end of said shaft, said blade having surface to surface contact with the upper surface of said baffle plate as it rotates, said blade member having a length slightly less than the diameter of the baffle plate and a width slightly greater than the diameter of said apertures, said blade being provided with a plurality of downwardly and outwardly beveled cutting edges for cutting off the flow of flavoring material as it moves periodically across the apertures of said baffle plate, and means for rotating said blade.

4. Apparatus for making a variegated product comprising an upper extrusion tube and a lower extrusion tube connected longitudinally, a baffle plate having a series of spaced apertures mounted within the upper extrusion tube, each aperture having a delivery tube depending therefrom and extending downwardly into said lower extrusion tube, said lower extrusion tube having an inlet above said baffle plate for receiving under pressure a contrasting flavoring material, a shaft axially extending downwardly through the top of said upper tube, a rotary cutting blade mounted on the lower end of said shaft, said blade having surface to surface contact with the upper surface of said baffle plate as it rotates, said blade having a length slightly less than the diameter of the baffle plate and a width slightly greater than the smallest of said apertures, said blade having its opposite ends and sides beveled to provide a perimetrical cutting edge for cutting fibrous material as it enters said apertures in said baffle plate, and means for rotating said blade.

5. Apparatus for making a variegated product comprising an upper extrusion tube and a lower extrusion tube connected longitudinally, an apertured baffle plate mounted within the upper extrusion tube, each aperture of said baffle plate having a delivery tube depending therefrom and extending downwardly into said lower extrusion tube, said lower extrusion tube having an inlet and an outlet through which a base material may be forced under pressure, the upper extrusion tube having an inlet above said baffle plate for receiving under pressure a contrasting flavoring material, a shaft extending downwardly through the upper tube having a cutting blade mounted on the lower end thereof and operating in surface to surface contact with the upper surface of said baffle plate, a second shaft mounted in spaced axial alignment with the shaft operating said cutting blade, resilient means for connecting said shafts operably and holding said cutting blade in surface to surface contact with the upper surface of said baffle plate, said blade having a surface area smaller than the surface area of said baffle plate whereby only a portion of said plate is covered at any one time, and means for rotating said second shaft.

References Cited in the file of this patent

UNITED STATES PATENTS

| | | |
|---|---|---|
| 1,083,275 | Eberhard | Jan. 6, 1914 |
| 1,690,904 | Laemmel | Nov. 6, 1928 |
| 1,825,475 | Pfeiffer | Sept. 29, 1931 |
| 1,889,381 | Rush | Nov. 29, 1932 |
| 2,389,084 | Routh | Nov. 13, 1945 |
| 2,527,273 | Marks | Oct. 24, 1950 |